US012007075B2

(12) United States Patent
Shao et al.

(10) Patent No.: US 12,007,075 B2
(45) Date of Patent: Jun. 11, 2024

(54) METHODS AND INTERNET OF THINGS (IOT) SYSTEMS FOR MANAGING SMART GAS SAFETY HAZARD ITEMS BASED ON GEOGRAPHIC INFORMATION SYSTEMS

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/464,241

(22) Filed: Sep. 10, 2023

(65) Prior Publication Data

US 2023/0417372 A1 Dec. 28, 2023

(30) Foreign Application Priority Data

Jul. 19, 2023 (CN) ........................ 202310885237.1

(51) Int. Cl.
*F17D 3/01* (2006.01)
*G16Y 10/35* (2020.01)
*G16Y 20/10* (2020.01)
(Continued)

(52) U.S. Cl.
CPC ................ *F17D 3/01* (2013.01); *G16Y 10/35* (2020.01); *G16Y 20/10* (2020.01); *G16Y 40/35* (2020.01); *G16Y 40/50* (2020.01)

(58) Field of Classification Search
CPC .......... F17D 3/01; G16Y 10/35; G16Y 20/10; G16Y 40/35; G16Y 40/50;
(Continued)

(56) References Cited

U.S. PATENT DOCUMENTS 11,892,563 B1 * 2/2024 Mistry .................... G01S 13/87
2022/0331978 A1 * 10/2022 Bryner .................. B25J 19/027
(Continued)

FOREIGN PATENT DOCUMENTS

CN 107271110 B 3/2018
CN 115545231 A 12/2022
(Continued)

OTHER PUBLICATIONS

Notification to Grant Patent Right for Invention in Chinese Application No. 202310885237.1 dated Sep. 16, 2023, 4 pages.
(Continued)

*Primary Examiner* — Omar Casillashernandez
(74) *Attorney, Agent, or Firm* — METIS IP LLC

(57) ABSTRACT

The embodiments of the present disclosure provide methods and Internet of Things (IoT) systems for managing a smart gas safety hazard item based on a Geographic Information System (GIS). The method includes: obtaining gas safety hazard data of a gas pipeline network; dividing the gas pipeline network into one or more gas inspection units based on the gas safety hazard data and geographic information data of the gas pipeline network; assigning one or more gas safety hazard items to the gas inspection unit based on the gas safety hazard data corresponding to the gas inspection unit; determining a processing plan of the gas inspection unit; and determining an inspection plan based on the processing plan and a gas GIS.

5 Claims, 4 Drawing Sheets

(51) Int. Cl.
*G16Y 40/35* (2020.01)
*G16Y 40/50* (2020.01)

(58) Field of Classification Search
CPC ....... G06Q 10/06314; G06Q 10/06316; G06Q 10/20; G06Q 50/06; G06F 16/29; G06F 18/23
USPC .......................................................... 340/603
See application file for complete search history.

(56) References Cited

U.S. PATENT DOCUMENTS

| | | | | |
|---|---|---|---|---|
| 2023/0294313 | A1* | 9/2023 | Pryor | G01M 3/04 |
| 2023/0296480 | A1* | 9/2023 | Eicher | G01N 17/00<br>702/34 |

FOREIGN PATENT DOCUMENTS

| | | | |
|---|---|---|---|
| CN | 115619071 | A | 1/2023 |
| CN | 115899595 | A | 4/2023 |
| CN | 115907264 | A | 4/2023 |
| CN | 116011740 | A | 4/2023 |
| WO | 2023061039 | A1 | 4/2023 |

OTHER PUBLICATIONS

First Office Action in Chinese Application No. 202310885237.1 dated Aug. 31, 2023, 11 pages.

Zhang, Xiuzhang, Application of UAV in Inspection of Urban High Pressure Gas Pipeline, Energy Research and Management, 127-131, 2020.

* cited by examiner

METHODS AND INTERNET OF THINGS (IOT) SYSTEMS FOR MANAGING SMART GAS SAFETY HAZARD ITEMS BASED ON GEOGRAPHIC INFORMATION SYSTEMS

CROSS-REFERENCE TO RELATED APPLICATION

This application claims priority to Chinese Patent Application No. 202310885237.1, filed on Jul. 19, 2023, the entire contents of which are hereby incorporated herein by reference.

TECHNICAL FIELD

The present disclosure relates to the field of Internet of Things (IoT) technology, and in particular, to a method and an Internet of Things (IoT) system for managing a smart gas safety hazard item based on a Geographic Information System (GIS).

BACKGROUND

To ensure the safe use of gas, regular inspections of gas pipelines is an important means. Existing gas inspections (such as manual inspections and drone/unmanned vehicle inspections) often only determine whether a gas leakage has occurred, and are ineffective in identifying and analyzing potential safety hazards such as aging, corrosion, damage, and overhead of gas network pipelines.

The Geographic Information System (GIS) combining geography, cartography, remote sensing, and computer science has been widely used in various fields. The GIS used in the gas field (gas GIS for short) allows the integration of existing or planned station control systems, gas leakage alarm systems, safety monitoring, inspections, and video surveillance of gas companies. Based on gas GIS, the digitization of leakage, safety monitoring, and inspections of gas pipeline systems may be achieved.

CN107271110B proposes a method for locating and detecting a leakage point of a buried gas pipeline based on Beidou positioning, which locates leakage points of gas pipelines by Beidou positioning combined with tracer gas detection. However, it does not involve the formulation of a targeted inspection plan based on different classifications and levels of gas safety hazard items at different inspection points.

Therefore, it is desirable to provide a method and an Internet of Things (IoT) system for managing a smart gas safety hazard item based on a GIS to realize reasonable classifications and levels of gas safety hazard items in order to improve inspection quality and efficiency.

SUMMARY

One or more embodiments of the present disclosure provide a method for managing a smart gas safety hazard item based on a Geographic Information System (GIS). The method comprises: obtaining gas safety hazard data of a gas pipeline network, wherein the gas safety hazard data includes a location of a historical safety hazard in the gas pipeline network and a safety hazard feature corresponding to the location, and the safety hazard feature includes at least one of a type of the safety hazard or a degree of the safety hazard; dividing the gas pipeline network into one or more gas inspection units based on the gas safety hazard data and geographic information data of the gas pipeline network, wherein the geographic information data includes at least one of altitude data, perimeter road data, or vegetation data; for each of the one or more gas inspection units, assigning one or more gas safety hazard items to the gas inspection unit based on the gas safety hazard data corresponding to the gas inspection unit; determining a processing plan of the gas inspection unit; and determining an inspection plan based on the processing plan and a gas GIS, wherein the inspection plan includes at least one of an inspection route, an inspection time, or inspection content of the gas inspection unit.

One of the embodiments of the present disclosure provides an Internet of Things (I) system for managing a smart gas safety hazard item based on a GIS. The IoT system includes a smart gas user platform, a smart gas service platform, a smart gas management platform, a smart gas pipeline network device sensing network platform, and a smart gas pipeline network device object platform. The smart gas user platform includes a plurality of smart gas user sub-platforms; the smart gas service platform includes a plurality of smart gas service sub-platforms; the smart gas management platform includes a smart gas pipeline network safety management sub-platform and a smart gas data center; the smart gas management platform is configured to: obtain gas safety hazard data of a gas pipeline network, wherein the gas safety hazard data includes a location of a historical safety hazard in the gas pipeline network and a safety hazard feature corresponding to the location, and the safety hazard feature includes at least one of a type of the safety hazard or a degree of the safety hazard, divide the gas pipeline network into one or more gas inspection units based on the gas safety hazard data and geographic information data of the gas pipeline network, wherein the geographic information data includes at least one of altitude data, perimeter road data, or vegetation data, for each of the one or more gas inspection units, assign one or more gas safety hazard items to the gas inspection unit based on the gas safety hazard data corresponding to the gas inspection unit, determine a processing plan of the gas inspection unit, and determine an inspection plan based on the processing plan and a gas GIS, wherein the inspection plan includes at least one of an inspection route, an inspection time, or inspection content of the gas inspection unit; the smart gas pipeline network device sensing network platform is configured to interact with the smart gas data center and the smart gas pipeline network device object platform and send an instruction for obtaining data related to operation of a pipeline network device to the smart gas pipeline network device object platform; and the smart gas pipeline network device object platform is configured to obtain the data related to the operation of the pipeline network device.

One or more embodiments of the present disclosure provide a non-transitory computer-readable storage medium storing computer instructions, wherein when reading the computer instructions in the storage medium, a computer implements the method as described in any of the above embodiments.

BRIEF DESCRIPTION OF THE DRAWINGS

The present disclosure will be further illustrated by way of exemplary embodiments. These exemplary embodiments will be described in detail by way of drawings. These embodiments are non-limiting exemplary embodiments, in which like reference numerals represent similar structures, wherein.

DETAILED DESCRIPTION

Figure 1:
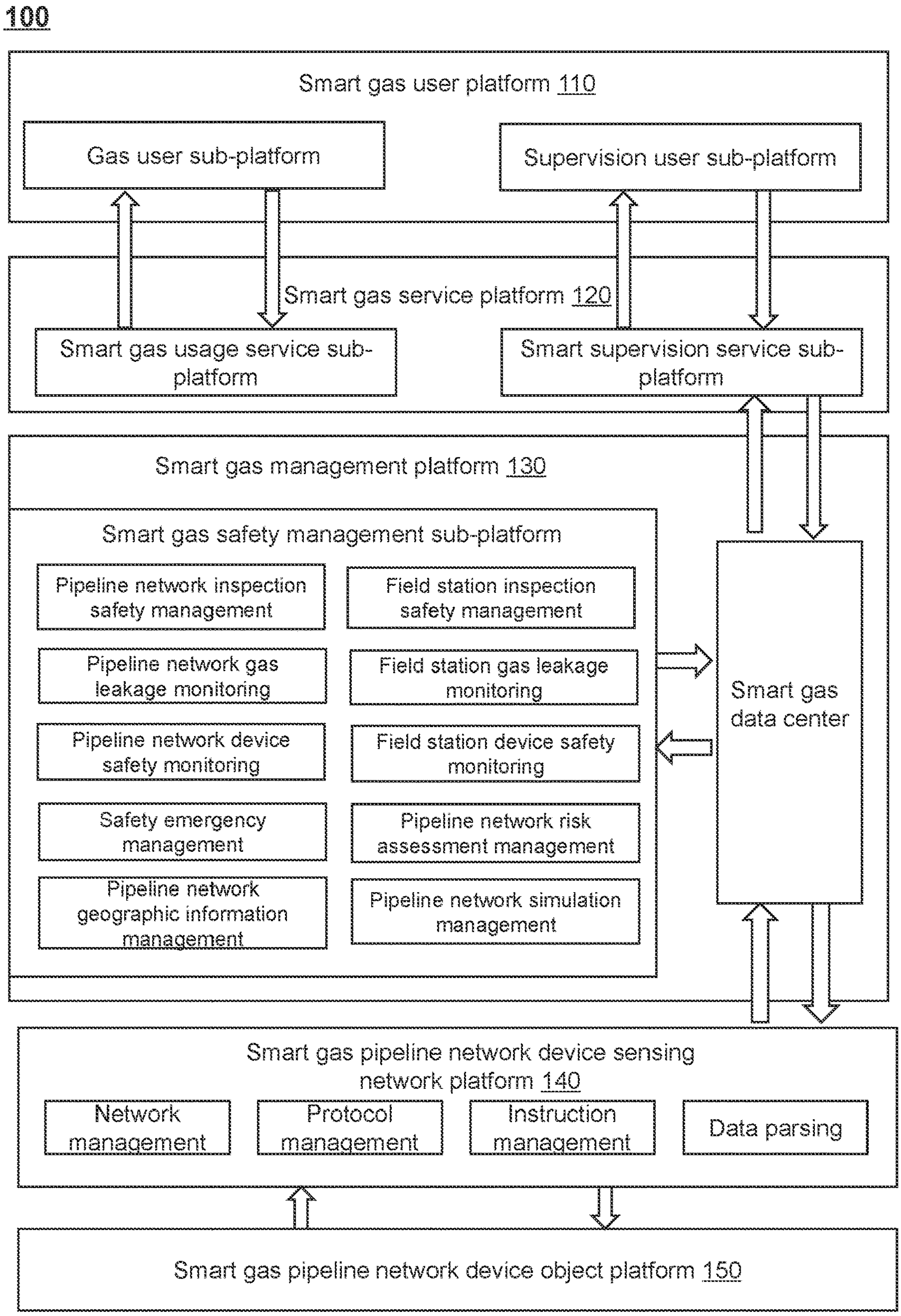
FIG. 1 is a schematic diagram illustrating an exemplary Internet of Things (IoT) system for managing a smart gas safety hazard item based on a Geographic Information System (GIS) according to some embodiments of the present disclosure.

In order to more clearly illustrate technical solutions of the embodiments of the present disclosure, a brief introduction of the drawings referred to the description of the embodiments is provided below. Obviously, the drawings below are only some examples or embodiments of the present disclosure, and the same numerals in the drawings refers to the same structure or operation.

CN107271110B proposes a method for locating and detecting a leakage point of a buried gas pipeline based on Beidou positioning, which may locate leakage points of the gas pipelines by Beidou positioning combined with tracer gas detection, but it does not involve the investigation of risks such as corrosion and aging of the gas pipelines. A method and an Internet of Things (IoT) system for managing a smart gas safety hazard item based on a Geographic Information System (GIS) described in some embodiments of the present disclosure may predict safety hazard items corresponding to different inspection points based on geographical and environmental data of the inspection points, and further formulate gas pipeline network inspection routes, thereby improving inspection quality and efficiency.

FIG. 1 is a schematic diagram illustrating an exemplary Internet of Things (IoT) system for managing a smart gas safety hazard item based on a Geographic Information System (GIS) according to some embodiments of the present disclosure.

As shown in FIG. 1, the Internet of Things (IoT) system 100 for managing a smart gas safety hazard item based on a Geographic Information System (GIS) (hereinafter referred to as the IoT system 100) may include a smart gas user platform 110, a smart gas service platform 120, a smart gas management platform 130, a smart gas pipeline network device sensing network platform 140, and a smart gas pipeline network device object platform 150.

The smart gas user platform 110 may be configured to interact with a user. In some embodiments, the smart gas user platform may be configured as a terminal device.

In some embodiments, the smart gas user platform may include a gas user sub-platform, and a supervision user sub-platform.

The gas user sub-platform may be configured to provide a gas user with data related to gas usage and solutions to gas problems. The supervision user sub-platform may be configured to supervise the operation of the IoT system 100.

The smart gas service platform 120 may be configured to receive and transmit at least one of data or information such as advisory messages, inquiry instructions, troubleshooting solutions, etc. The smart gas service platform 120 may obtain gas device parameter management information, etc., from the smart gas management platform 130 (e.g., a smart gas data center) and send the gas device parameter management information, etc., to the smart gas user platform 110.

In some embodiments, the smart gas service platform 120 may include a smart gas usage service sub-platform and a smart supervision service sub-platform. Different smart gas service sub-platforms correspond to and interact with different smart gas user sub-platforms.

The smart gas usage service sub-platform may be a platform configured to provide a gas service for the gas user.

The smart supervision service sub-platform may be a platform configured to provide a supervision need for a supervision user.

The smart gas management platform 130 (hereinafter referred to as the management platform) may be a platform that coordinates connections and collaborations among various functional platforms, converges all information of the IoT system, and provides perception management and control management functions for operations of the IoT system.

In some embodiments, the management platform may include a smart gas safety management sub-platform and a smart gas data center (hereinafter referred to as the data center).

The smart gas safety management sub-platform may be configured to manage a smart gas pipeline network device. In some embodiments, the smart gas safety management sub-platform may analyze and process data related to the smart gas pipeline network device. In some embodiments, the smart gas safety management sub-platform may include a plurality of sub-modules, such as a pipeline network inspection safety management module, a field station inspection safety management module, etc.

The data center may be configured to store and manage all operational information of the IoT system 100. In some embodiments, the data center may be configured as a storage device for storing data related to gas safety hazard data, geographic information data, etc.

In some embodiments, the management platform may also be configured to: obtain gas safety hazard data of a gas pipeline network; divide the gas pipeline network into one or more gas inspection units based on the gas safety hazard data and the geographic information data of the gas pipeline network, for each of the one or more gas inspection units, assign one or more gas safety hazard items to the gas inspection unit based on the gas safety hazard data corresponding to the gas inspection unit; determine a processing plan of the gas inspection unit; and determine an inspection plan based on the processing plan and a gas GIS. More descriptions of the management platform may be found elsewhere in the present disclosure, for example, in FIG. 2.

In some embodiments, the management platform may interact with the smart gas service platform and the smart gas pipeline network device sensing network platform through the data center for information exchange, respectively. For example, the data center may send the data related to the gas safety hazard and the geographic information to the smart gas service platform.

The smart gas pipeline device sensing network platform 140 (hereinafter referred to as the sensing platform) may be a functional platform for managing sensing communications, including network management, protocol management, instruction management, data parsing, and other functions. In some embodiments, the sensing platform can perform functions of perceptual information sensing communication and control information sensing communication.

The smart gas pipeline network device object platform 150 (hereinafter referred to as the device object platform) may be a functional platform for perceptual information generation and control information implementation. For example, the device object platform may monitor and generate operational information of the gas pipeline network device.

In some embodiments, the device object platform may be configured to obtain the gas safety hazard data of the gas pipeline network.

In some embodiments, the device object platform may be configured as various types of gas pipeline network devices and monitoring devices.

In some embodiments of the present disclosure, a closed loop of information operation may be formed between the device object platform and the smart gas user platform based on the IoT system 100 and may be operated in a coordinated and regular manner under unified management of the smart gas management platform, so as to make the management of gas safety hazard items digitized and smart.

It should be noted that the above description of the IoT system for managing the smart gas safety hazard item based on the GIS as well as the various platforms and modules of the IoT system are descriptive convenience only and do not limit the present disclosure to the scope of the cited embodiments.

Figure 2:
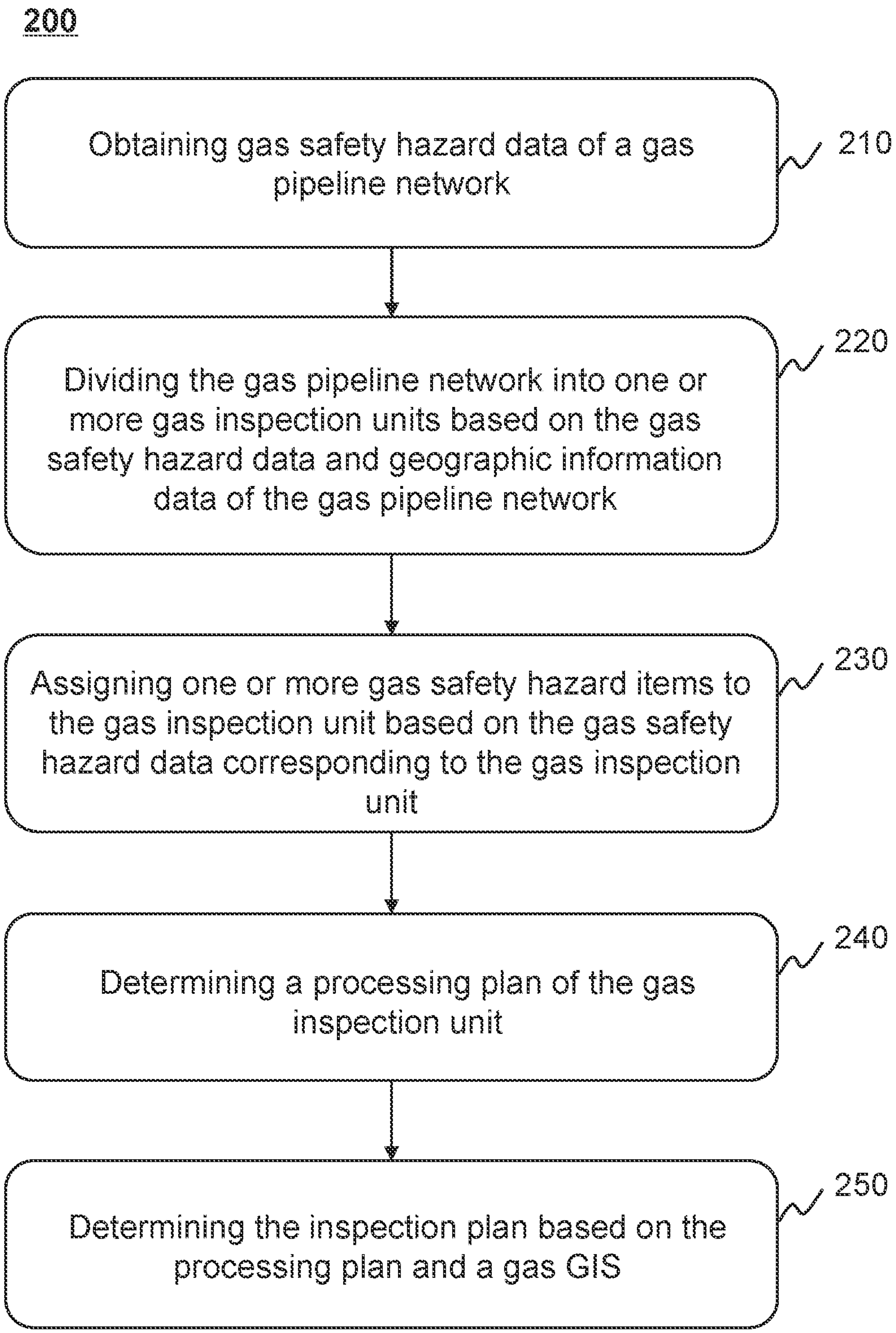
FIG. 2 is a flowchart illustrating an exemplary process of a method for managing a smart gas safety hazard item based on a Geographic Information System (GIS) according to some embodiments of the present disclosure.

FIG. 2 is a flowchart illustrating an exemplary process of a method for managing a smart gas safety hazard item based on a Geographic Information System (GIS) according to some embodiments of the present disclosure. As shown in FIG. 2, the process 200 includes the following operations. In some embodiments, the process 200 may be implemented by the management platform 130.

In 210, obtaining gas safety hazard data of a gas pipeline network.

The gas safety hazard data refers to safety hazard data that exists in the gas pipeline network (e.g., a gas valve, a gas regulator station, a gas pipeline, and many other types of gas devices). The gas safety hazard data includes a location of a historical safety hazard in the gas pipeline network and a safety hazard feature corresponding to the location.

The safety hazard feature includes at least one of a type of the safety hazard or a degree of the safety hazard.

The type of the safety hazard refers to a type of safety hazard (e.g., water corrosion, electrical corrosion, and weld leakage) that exists in the gas pipeline network.

The degree of the safety hazard refers to a severity of the safety hazard in the gas pipeline network. In some embodiments, the degree of the safety hazard may be indicated by a value from 1 to 100. The larger the value, the more serious the safety hazard.

In some embodiments, the safety hazard data may be obtained based on an input of processing personnel and/or inspection machinery (e.g., a drone, etc.). For example, the management platform may obtain the safety hazard data input the processing personnel and/or the inspection machinery after each inspection and store the safety hazard data in a data center.

In 220, dividing the gas pipeline network into one or more gas inspection units based on the gas safety hazard data and geographic information data of the gas pipeline network.

The geographic information data of the gas pipeline network may include at least one of altitude data, perimeter road data, or vegetation data. In some embodiments, the geographic information data of the gas pipeline network may also include a variety of other data, such as latitude and longitude data and topographic data of the gas pipeline network, etc.

The perimeter road data refers to data related to a road around the gas pipeline network. The perimeter road data may include a road type (e.g., no road, dirt road, concrete road, etc.), a road smoothness, etc.

The vegetation data refers to data related to vegetation around the gas pipeline network. The vegetation data may include a vegetation type, a vegetation height, etc.

The gas inspection unit refers to a region of a single inspection obtained after the gas pipeline network to be inspected is divided. The gas inspection unit includes a gas pipeline section and a gas device such as a valve corresponding to the gas pipeline section. In some embodiments, the gas inspection unit includes at least one gas inspection subunit. The gas inspection subunit is a smallest region of the gas pipeline network during the inspection. For example, the gas inspection subunit may be the regulator station, the gas valve, the gas pipeline section, or any combination thereof. The gas inspection subunit may be preset in advance based on an actual condition.

In some embodiments, the gas inspection unit may have unit data, and the unit data may include a unit type, unit geographic information data, unit environmental data, the gas safety hazard item, historical unit safety hazard data, etc. More descriptions of the unit data, etc., may be found in relevant sections later in the present disclosure.

In some embodiments, the management platform may divide the gas pipeline network into the one or more gas inspection units based on data such as a length of the gas pipeline network. For example, the management platform may equate the entire gas pipeline network into a plurality of sub-gas pipeline networks and determine each sub-gas pipeline network as a gas inspection unit.

In some embodiments, the management platform may determine the geographic information data based on a gas GIS. In some embodiments, the management platform may also determine the environmental data of the gas pipeline network based on the gas GIS.

The environmental data refers to data related to an environment in which the gas pipeline network is located. The environmental data includes a temperature, a humidity, a pedestrian volume, weather data, etc.

In some embodiments, the management platform may divide the gas pipeline network into the one or more gas inspection units based on the geographic information data and the environmental data. For example, the management platform may divide gas inspection subunits with similar features such as terrain undulation and topography into one gas inspection unit, etc.

In some embodiments, the management platform may also determine a set of processing devices based on the geographic information data and the environmental data. The set of processing devices may include processing devices associated with the gas inspection unit. For example, the set of processing devices may include an obstacle clearing device (e.g., a knife for clearing grass and trees), a waterproofing device, etc.

For example, it is necessary to carry the obstacle clearing device when the inspection unit is located in woods; and it is necessary to carry the waterproof device, etc., when the inspection unit is located in a wetland.

In one or more embodiments of the present disclosure, the gas inspection unit is determined based on the geographical information data and the environmental data, and the set of processing devices is further determined, so that corresponding processing devices may be carried based on conditions of different inspection units, thereby reducing the burden on inspection personnel and improving inspection efficiency.

In some embodiments, the management platform may also divide the gas pipeline network into the one or more gas inspection units through a first preset algorithm based on the geographic information data, the environmental data, and a pipeline type (e.g., a main pipeline, a branch pipeline).

The first preset algorithm may include a clustering technique. In some embodiments, the management platform may determine the one or more gas inspection units through the clustering technique based on the geographic information data, the environmental data, and the pipeline type. A feature vector of the clustering may be expressed as (x, y, z) and elements of the feature vector represent the geographic information data, the environmental data, and the pipeline type, respectively.

In some embodiments, the management platform may determine one or more results obtained by the clustering as the one or more gas inspection units.

In some embodiments, the management platform may also obtain a plurality of contour clusters by clustering based on the altitude data of each gas inspection subunit in the gas pipeline network. Each of the plurality of contour clusters includes a collection of gas inspection subunits with a same or similar altitude. The management platform may determine each contour cluster as one gas inspection unit.

In one or more embodiments of the present disclosure, clustering and determining the gas inspection unit based on altitude may facilitate the determination of an inspection plan and an inspection route (e.g., assigning more experienced personnel to gas inspection units in regions with significant altitude changes or high altitudes), thereby improving inspection efficiency.

In some embodiments, the management platform may also cluster the environmental data of each gas inspection subunit to obtain one or more clusters with similar environmental data and determine the one or more clusters with similar environmental data as the one or more gas inspection units.

In one or more embodiments of the present disclosure, clustering and determining the gas inspection units based on the environmental data may facilitate the determination of the device to be carried (e.g., the waterproof device for the wetland, etc.), thereby reducing the burden on the processing personnel. Additionally, under similar environmental data, there is a higher probability of encountering similar safety hazards. Therefore, gas inspection subunits with similar environmental conditions are determined as the gas inspection units, which may achieve better inspection results.

In some embodiments, a clustering feature of the clustering technique may also include a pipeline importance of a gas pipeline corresponding to the gas inspection unit.

The pipeline importance refers to an importance of the gas pipeline connected to the gas inspection unit. More descriptions of determining the pipeline importance may be found in FIG. 3.

In one or more embodiments of the present disclosure, the clustering feature includes the pipeline importance, which may facilitate simultaneous inspection of gas pipelines with similar importance, and priority may be given to inspecting important pipelines.

In 230, assigning one or more gas safety hazard items to the gas inspection unit based on the gas safety hazard data corresponding to the gas inspection unit.

The one or more gas safety hazard items include safety hazard features and safety hazard locations of one or more gas inspection subunits corresponding to the gas inspection unit. The safety hazard location refers to a location where a safety hazard may exist, e.g., a location where a gas leakage may occur, etc. Descriptions related to the safety hazard feature may be found in the operation 210.

In some embodiments, the management platform may determine the gas safety hazard items corresponding to the gas inspection unit based on the safety hazard data of one or more gas inspection subunits corresponding to the gas inspection unit. For example, the management platform may determine the safety hazard data of the gas inspection subunit as the gas safety hazard items of the gas inspection unit. One gas inspection unit may have a plurality of safety hazard items (e.g., a plurality of gas inspection subunits within the gas inspection unit have safety hazard data).

In 240, determining a processing plan of the gas inspection unit.

The processing plan refers to a plan to process the safety hazard items of the gas inspection unit. More detailed descriptions of the processing plan may be found in FIG. 3.

In some embodiments, the management platform may determine the processing plan of the gas inspection unit based on historical data. For example, the management platform may determine a processing plan corresponding to a historical gas inspection unit in a historical inspection process as the processing plan of the gas inspection unit in a current inspection.

In some embodiments, the management platform may also determine the processing plan corresponding to the gas inspection unit based on the unit geographic information data, the unit environmental data, and the gas safety hazard items. More detailed descriptions may be found in FIG. 3.

In 250, determining the inspection plan based on the processing plan and a gas GIS.

The inspection plan refers to a plan of conducting an inspection of the gas pipeline network. The inspection plan may include at least one of the inspection route, an inspection time, or inspection content of the gas inspection unit.

The inspection time refers to a time for inspecting the gas pipeline network and may include a sum of a total travel time of the processing personnel to each gas inspection unit and a total processing time of all gas inspection units.

The total travel time may be determined based on the inspection route. For example, after determining the inspection route, the management platform may calculate the travel time of the processing personnel to each gas inspection unit and further determine the total travel time.

The total processing time may be determined based on the processing time of each gas inspection unit. More detailed descriptions of the processing time of the gas inspection unit may be found in FIG. 3.

In some embodiments, the inspection content may include a targeted check of potential safety hazard data to determine whether a malfunction actually occurs. If the malfunction actually occurs, it is processed based on the processing plan determined in the operation 240.

In some embodiments, the inspection content may also include an inspection of a gas inspection unit that may not be inspected manually through the inspection machinery to determine whether the gas inspection unit fails.

In some embodiments of the present disclosure, the inspection of the gas inspection unit that may not be inspected manually through inspection machinery may be done safely and conveniently, which can ensure the quality of the inspection.

In some embodiments, the inspection content may also include a reinspection of the gas inspection unit where the malfunction actually occurs to determine whether the malfunction is actually removed.

In some embodiments, to improve inspection efficiency, the management platform may determine the gas inspection unit that needs to be reinspected based on a processing priority. For example, the management platform may reinspect a gas inspection unit with the processing priority greater than a certain threshold. More detailed descriptions of the processing priority may be found in FIG. 3 and related descriptions.

In some embodiments of the present disclosure, the quality of the inspection may be further improved by the reinspection, thereby obtaining a better gas pipeline network maintenance result.

In some embodiments, the management platform determining the inspection plan based on the processing plan and the gas GIS includes: determining potential safety hazard data of different gas inspection units through a potential safety hazard prediction model based on the gas safety hazard data of the gas inspection unit; determining the inspection route through a second preset algorithm based on the potential safety hazard data, the processing plan, and the gas GIS; and determining the inspection time based on the inspection route. The potential safety hazard prediction model is a machine learning model.

The potential safety hazard data may include pending safety hazard data, impact safety hazard data, etc.

To ensure the inspection efficiency, the pending safety hazard data may be generated from a missed inspection due to at least one of the reasons that it may be failed to inspect all gas inspection units or due to the inspection is conducted fast.

The pending safety hazard data refers to data related to an undetected safety hazard item during the inspection. The pending safety hazard data may include a pending safety hazard type, a pending safety hazard location, and a first potential level. The first potential level refers to a level of an impact of the undetected safety hazard item on the malfunction of the gas inspection unit.

In some embodiments, the management platform may inspect the gas inspection unit with the pending safety hazard data based on the inspection machinery to determine whether the gas inspection unit fails to ensure the inspection effect.

The impact safety hazard data refers to data of an impact of a determined safety hazard item of one gas inspection unit on other gas inspection units. For example, when a gas inspection unit is a regulator station, the gas inspection unit may have a relatively great impact on other gas inspection units. The impact safety hazard data may include a second potential level. The second potential level refers to a level of an impact of the determined safety hazard item on other gas inspection units.

In some embodiments, different gas inspection units may have different third potential levels. The third potential level refers to a level of possible malfunction of the gas inspection unit. The greater the third potential level, the greater the probability of malfunction of the gas inspection unit.

The third potential level may be related to a statistical result of historical safety hazard data. For example, the more frequently the historical malfunction occurred, the greater the third potential level of the gas inspection unit.

The third potential level may also be related to a rectification cycle. For example, the longer the rectification cycle, the greater the third potential level of the gas inspection unit. The rectification cycle refers to a time elapsed since a last rectification of a certain malfunction.

In some embodiments, the third potential level may also be determined based on the first potential level and the second potential level. For example, the third potential level may be a weighted sum of the first potential level and the second potential level, etc.

In some embodiments of the present disclosure, the third potential level is determined based on the first potential level and the second potential level, which may better reflect a possibility of an actual malfunction of the gas inspection unit.

In some embodiments, the management platform may determine the potential safety hazard data of different gas inspection units through the potential safety hazard prediction model based on the gas safety hazard data of the gas inspection unit. The potential safety hazard prediction model is a machine learning model, e.g., a deep neural network model. More descriptions about the potential safety hazard prediction model may be found in FIG. 4.

In some embodiments, the pending safety hazard data is also related to internal data of the gas pipeline.

The internal data of the gas pipeline includes gas flow rate data, an internal pressure of the pipeline, an internal temperature of the pipeline, an internal humidity of the pipeline, etc.

In some embodiments, the management platform may determine the pending safety hazard data based on a vector matching manner. For example, the management platform may collect the internal data of the gas pipeline before each inspection and compare the internal data with data collected before a last inspection, determine a change vector of the internal data of the gas pipeline, match the change vector with a first reference vector, and determine the pending safety hazard data of the gas pipeline. The first reference vector may include a historical change vector and pending safety hazard data corresponding to the historical change vector.

In one or more embodiments of the present disclosure, when a certain piece of internal data of the gas pipeline corresponding to the gas inspection unit changes abruptly, it indicates that the gas inspection unit may fail (e.g., an abrupt change of the pressure in the pipeline may indicate a possible leakage) and need to be inspected. The pending safety hazard data is related to the internal data of the gas pipeline, which may further improve the accuracy of the pending safety hazard data.

In some embodiments, the management platform may determine the inspection route through the second preset algorithm based on the potential safety hazard data, the processing plan, and the gas GIS.

The second preset algorithm includes determining an inspection urgency level of the gas inspection unit based on the processing plan and the potential safety hazard data; and determining the inspection route based on the inspection urgency levels of different gas inspection units. In some embodiments, the second preset algorithm may be implemented by the management platform.

In some embodiments, the management platform may determine the inspection urgency level of the gas inspection unit based on the processing priority and the third potential level of the gas inspection unit. Exemplarily, the inspection urgency level may be determined based on the following equation (1):

$$p=\omega_1\times k_1+\omega_2\times k_2 \tag{1}$$

where p denotes the inspection urgency level; $k_1$ and $k_2$ denote the processing priority and the third potential level of the gas inspection unit, respectively; and $\omega_1$ and $\omega_2$ denote a first weight and a second weight preset in advance, respectively.

In some embodiments, the management platform may mark a gas inspection unit with an inspection urgency level greater than a first threshold as a sub-emergency unit and a gas inspection unit with an inspection urgency level greater than a second threshold as an emergency unit. The first threshold and the second threshold may be preset in advance, and the second threshold is greater than the first threshold.

The emergency unit is a gas inspection unit that must be inspected during the inspection, and the sub-emergency unit is an optional gas inspection unit during the inspection.

In some embodiments, the management platform determining the inspection route based on the inspection urgency level includes: generating a plurality of candidate inspection routes; and determining the inspection route based on the plurality of candidate inspection routes.

The candidate inspection routes may be determined based on the emergency unit and the sub-emergency unit. In some embodiments, the management platform may randomly generate a plurality of gas inspection unit combinations; and for each gas inspection unit combination, generate a candidate inspection route through a GIS-based route planning algorithm. Each gas inspection unit combination includes all emergency units and random sub-emergency units. The GIS-based route planning algorithm may include a plurality of algorithms, such as a GIS-based Pathfinding algorithm.

In some embodiments, the management platform may determine the inspection route based on the plurality of candidate inspection routes. For example, the management platform may calculate an inspection time of each candidate inspection route and select a candidate inspection route with a shortest inspection time as a target inspection route. More descriptions of the inspection time may be found in the related section previously.

In some embodiments, the management platform may also determine the inspection route based on ratings of the candidate inspection routes. For example, a candidate inspection route with a highest rating is determined as the inspection route. Exemplarily, the rating of the candidate inspection routes may be determined based on the following equation (2):

$$f=Q_1\times t+Q_2\times s \tag{2}$$

where f denotes the rating of the candidate inspection route; t denotes the inspection time of the candidate inspection route; s denotes a count of gas inspection units of the candidate inspection route; $Q_1$ and $Q_2$ denote a third weight and a fourth weight, respectively, and may be preset based on needs, for example, if more gas inspection units need to be inspected, $Q_1<Q_2$, etc.

In one or more embodiments of the present disclosure, the inspection route is determined by the rating of the candidate inspection route, which may reduce the inspection time, inspect more gas inspection units at the same time, and obtain a better inspection result.

The method for managing the smart gas safety hazard item based on the GIS in one or more embodiments of the present disclosure may achieve at least the following effects: (1) the inspection content of the different gas inspection units is determined based on different geographic information data, the environmental data, etc., so as to carry out targeted inspection and maintenance of the potential safety hazards such as aging, corrosion, damage, and overhead of the gas pipeline network, which can improve inspection quality and efficiency; and (2) the inspection route is planed based on the processing priorities and the inspection urgency levels of different gas inspection units, which can further improve inspection quality and efficiency.

It should be noted that the above description about the process 200 is only for illustration and description, and does not limit the scope of application of the present disclosure. For those skilled in the art, various modifications and changes may be made to the process 200 under the guidance of the present disclosure. However, such modifications and changes are still within the scope of the present disclosure.

Figure 3:
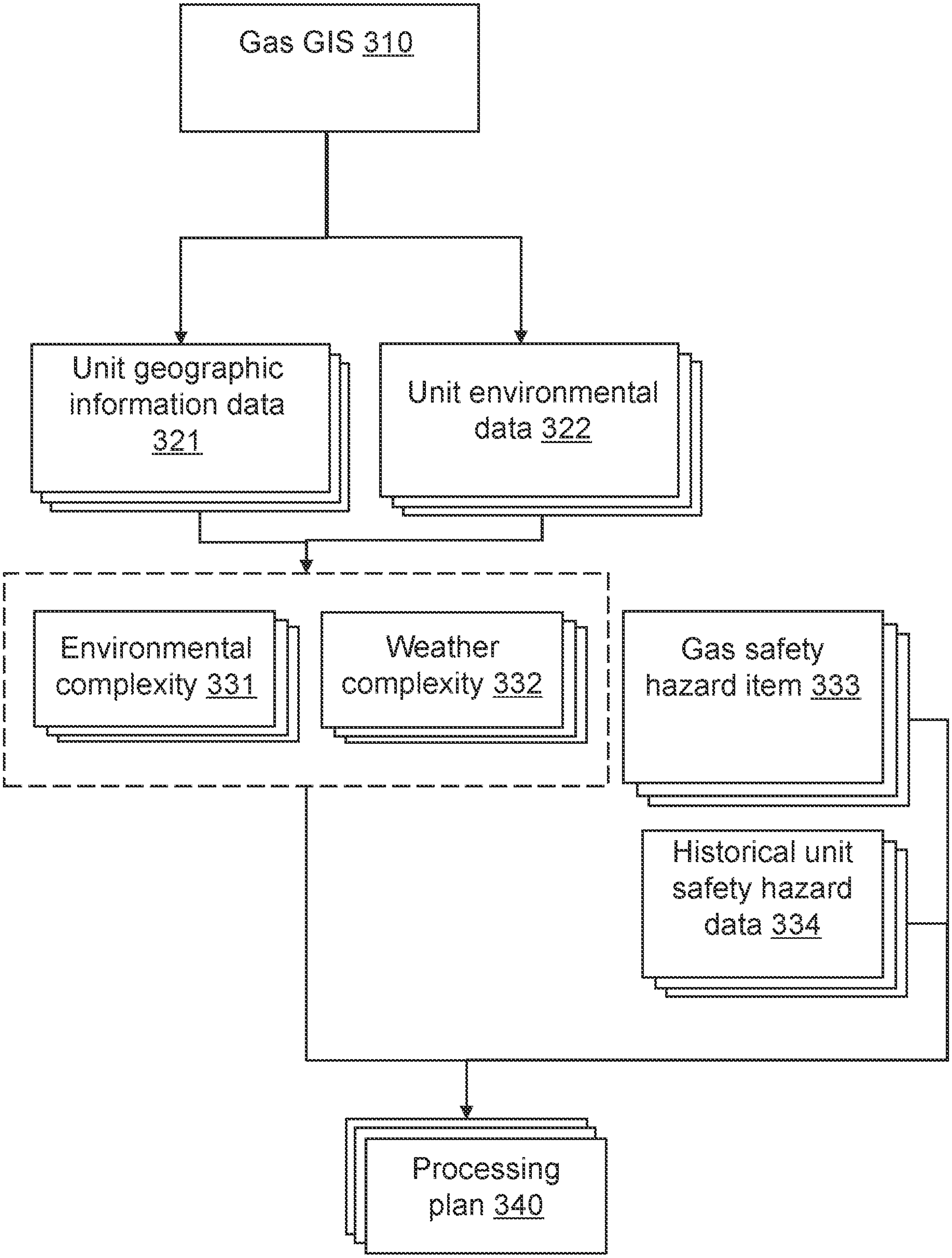
FIG. 3 is an exemplary schematic diagram illustrating determining a processing plan of a gas inspection unit according to some embodiments of the present disclosure.

FIG. 3 is an exemplary schematic diagram illustrating determining a processing plan of a gas inspection unit according to some embodiments of the present disclosure.

As shown in FIG. 3, a management platform may obtain unit geographic information data 321 and unit environmental data 322 of the gas inspection unit based on a gas GIS 310; determine an environmental complexity 331 and a weather complexity 332 of the gas inspection unit based on the unit geographic information data 321 and the unit environmental data 322; and determine a processing plan 340 of the gas inspection unit based on the environmental complexity 331, the weather complexity 332, a gas safety hazard item 333, and historical unit safety hazard data 334 of the gas inspection unit. More detailed descriptions of the gas safety hazard item 333 may be found in FIG. 2.

The unit geographic information data 321 refers to geographic information data of the gas inspection unit.

The unit environmental data 322 refers to environmental data of the gas inspection unit.

The unit geographic information data and the unit environmental data may be obtained based on the gas GIS.

The historical unit safety hazard data 334 refers to safety hazard data of the gas inspection unit during a historical inspection, which may be determined based on historical data. The historical unit safety hazard data may include a historical gas safety hazard item and historical safety hazard realization data. The historical safety hazard realization data refers to data related to an actual malfunction of a certain gas safety hazard item in the historical data, for example, a count of actual malfunctions of a historical gas safety hazard item M of the gas inspection unit, etc.

The environmental complexity 331 refers to a complexity of an environment in which the gas inspection unit is located.

The weather complexity 332 refers to a complexity of weather of the gas inspection unit.

In some embodiments, the management platform may determine the environmental complexity and the weather complexity of the gas inspection unit based on the unit geographic information data and the unit environmental data. For example, the management platform may determine the environmental complexity based on a variance of altitudes of different gas inspection subunits (e.g., the larger the variance, the greater the environmental complexity, etc.). As another example, the management platform may determine the weather complexity based on a variance of the environmental data of different gas inspection subunits over a plurality of consecutive days (e.g., the larger the variance, the greater the weather complexity, etc.).

The processing plan 340 may include at least one of a processing priority, assignment of processing personnel, an environmental response plan, or a processing time. More detailed descriptions of the processing plan may be found in FIG. 2.

The processing priority may characterize an order in which a plurality of gas inspection units are processed.

In some embodiments, the management platform may determine the processing priority of the safety hazard item through a safety hazard rating based on the environmental complexity 331, the weather complexity 332, the historical unit safety hazard data 334, etc. Exemplarily, the safety hazard rating may be determined based on a weighted sum of the environmental complexity 331, the weather complexity 332, and a historical safety hazard realization frequency, and weights may be preset. The historical safety hazard realization frequency refers to a frequency at which a certain safety hazard item is transformed into an actual malfunction (e.g., the frequency of an actual gas leakage of a safety hazard item of gas leakage), which may be determined based on the historical unit safety hazard data. The higher the safety hazard rating is, the higher the corresponding processing priority is.

In some embodiments, the management platform may also determine the processing priority through a safety hazard monitoring model based on a gas pipeline network map.

The gas pipeline network map refers to a data structure that reflects the gas inspection unit. The gas pipeline network map includes a node and an edge.

The node of the gas pipeline network map may represent the gas inspection unit.

The node of the gas pipeline network map may have a node feature. In some embodiments, the node feature may at least include the gas safety hazard item corresponding to the gas inspection unit, the historical unit safety hazard data, the unit geographic information data, and the unit environmental data.

In some embodiments, the node feature may also include a pipeline importance of the gas pipeline corresponding to the gas inspection unit. In some embodiments, the pipeline importance may be determined based on a count of branches of a pipeline and a gas flow rate in the pipeline. For example, the greater the count of branches of the pipeline and the greater the gas flow rate in the pipeline, the greater the pipeline importance of the pipeline.

In one or more embodiments of the present disclosure, the node feature includes the pipeline importance, which may more accurately reflects the importance of the gas inspection unit, thereby making the subsequent determination of the processing priority more reliable.

In some embodiments, the node feature may also include potential safety hazard data of a gas pipeline corresponding to the gas inspection unit. More detailed descriptions of the potential safety hazard data may be found in FIG. 2.

In one or more embodiments of the present disclosure, the node feature includes the potential safety hazard data, which may reflect a possible future safety hazard situation of the gas inspection unit, further improving the accuracy of the determined processing priority.

The edge of the gas pipeline network map may represent a gas pipeline connecting two gas inspection units, i.e., the nodes corresponding to the two gas inspection units connected by the gas pipeline may be connected by the edge.

The edge may have an edge feature. In some embodiments, the edge feature may include a length of the gas pipeline connecting the two gas inspection units.

The safety hazard monitoring model may be configured to determine the processing priority of the gas inspection unit. The safety hazard monitoring model may be a machine learning model, such as a graph neural network model, etc.

An input of the safety hazard monitoring model may include the gas pipeline network map, and an output may include the processing priority of each gas inspection unit.

In some embodiments, the safety hazard monitoring model may be determined based on a third training sample with a third label. The third training sample may include a sample gas pipeline network map, and the third label may include the processing priority. In some embodiments, the third training sample and the third label may be obtained based on simulation.

Exemplarily, the management platform may generate a large number of sample gas pipeline network maps at random (different sample gas pipeline maps have a same map structure but different node features); and for each sample gas pipeline network map, generate a plurality of processing priorities correspondingly. Further, the management platform may predict processing effects by processing the sample gas pipeline network maps corresponding to the plurality of processing priorities through simulation, and take a processing priority with a best processing effect as the third label of the sample gas pipeline network map. The best processing effect may include no malfunction or fewest malfunctions, etc., after processing.

In one or more embodiments of the present disclosure, the processing priority determined through the safety hazard monitoring model based on the gas pipeline network map is closer to an actual processing priority, improving the efficiency and effect of the gas pipeline network inspection.

The assignment of processing personnel may be determined based on a safety hazard feature. For example, the management platform may determine the assignment of processing personnel based on a preset comparison table of the processing personnel and the safety hazard feature. More detailed descriptions of the safety hazard feature may be found in FIG. 2.

The environmental response plan refers to a processing strategy when dealing with different environments during the inspection. In some embodiments, the environmental response plan may include determining the assignment of processing personnel based on the unit geographic information data and the unit environmental data. For example, the management platform may determine and recommend target processing personnel by retrieving a processing personnel database according to the unit geographic information data, the unit environmental data, and the safety hazard feature based on the GIS. The processing personnel database may include inspection data in a historical inspection process, the unit geographic information data, the unit environmental data, the safety hazard feature, the processing personnel, the processing effect, etc. The target processing personnel may include personnel with a highest frequency of processing or personnel with a best processing effect in a historical inspection process with historical unit geographic information data, historical unit environmental data, and a historical safety hazard feature similar to a current inspection process.

In some embodiments, the environmental response plan may also include determining a set of processing devices during the inspection. More descriptions of the set of processing devices may be found in FIG. 2.

The processing time refers to a time related to the inspection and processing of the gas inspection unit. The processing time may include the time of inspection and processing of the gas inspection unit and a time of departure to the gas inspection unit (i.e., a departure time). The time of inspection and processing of the gas inspection unit is related to the safety hazard feature, the unit geographic information data, and the unit environmental data; and the departure time is related to the processing priority.

In some embodiments, the management platform may determine the processing time through a vector matching manner based on the safety hazard feature, the unit geographic information data, the unit environmental data, and the processing priority. For example, the management platform may construct a processing time vector based on the safety hazard feature, the unit geographic information data, the unit environment data, and the processing priority, match the processing time vector with a second reference vector, determine the second reference vector satisfying a preset condition as a target vector, and determine the processing time of the gas inspection unit based on the target vector. For example, the management platform may determine a historical processing time in the target vector as the processing time of the gas inspection unit. The preset condition may be that the vector distance is minimum or smaller than a threshold value, etc. The second reference vector may include a historical processing time vector and a historical processing time corresponding to the historical processing time vector.

In some embodiments, the management platform may determine the processing priority, the assignment of processing personnel, the environmental response plan, and the processing time determined based on the embodiments as the processing plan.

In some embodiments, the management platform may also determine the processing plan of the gas inspection unit corresponding to the pending safety hazard data (i.e., a missed gas inspection unit with the safety hazard) based on the manner for determining the processing plan in the above embodiments.

In one or more embodiments of the present disclosure, the processing plan of the missed gas inspection unit with the safety hazard is determined, which may lead to better maintenance of the gas pipeline network and reduce the occurrence of malfunctions.

In one or more embodiments of the present disclosure, the processing plan of the gas inspection unit is determined based on the manner in the above embodiments, so that a processing plan more suitable for actual circumstances of different gas inspection units may be tailored for the different gas inspection units, thereby improving the quality and efficiency of the inspection.

Figure 4:
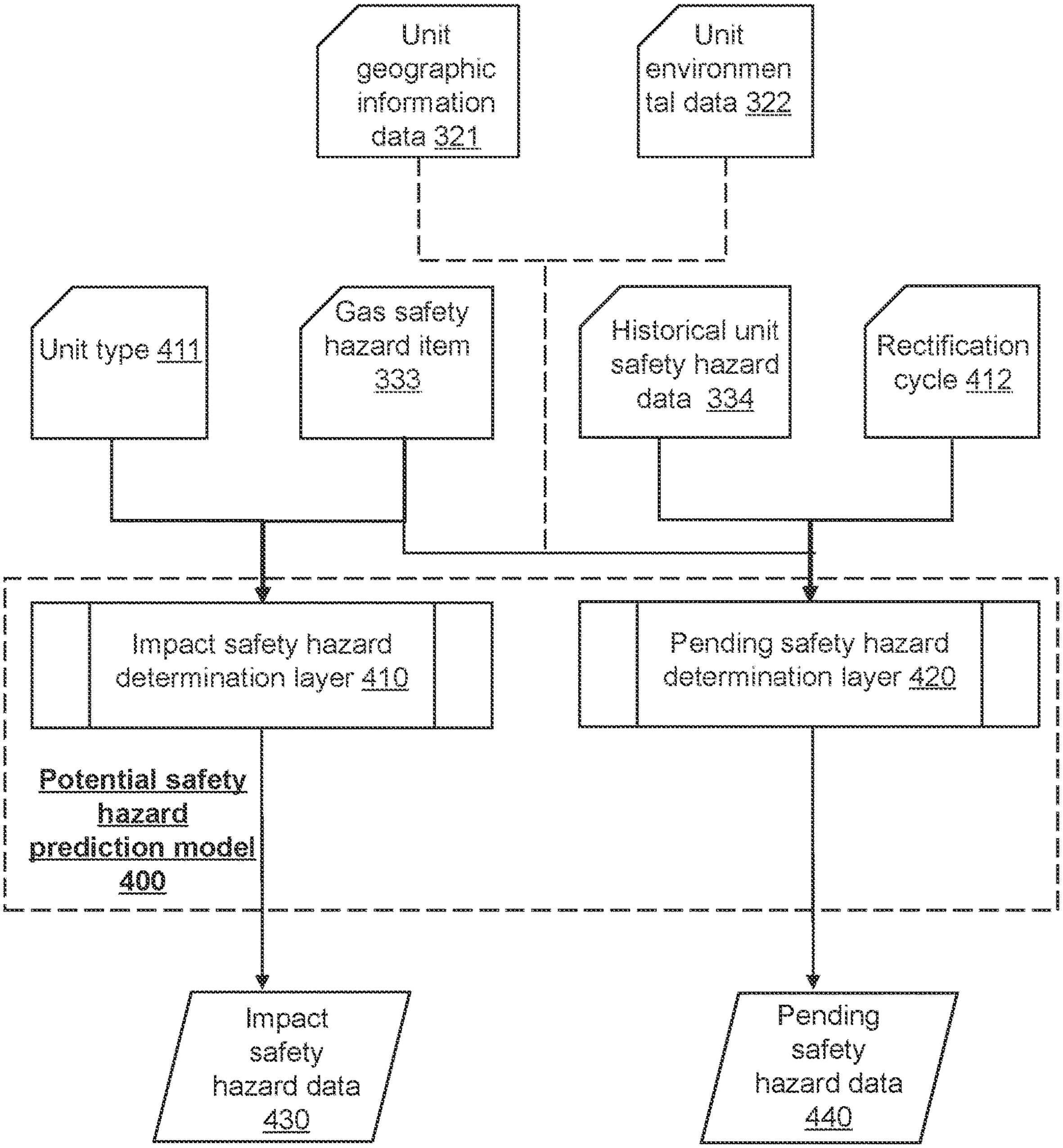
FIG. 4 is a schematic diagram illustrating an exemplary potential safety hazard prediction model according to some embodiments of the present disclosure.

FIG. 4 is a schematic diagram illustrating an exemplary potential safety hazard prediction model according to some embodiments of the present disclosure. As shown in FIG. 4, the potential safety hazard prediction model 400 includes an impact safety hazard determination layer 410 and a pending safety hazard determination layer 420.

The potential safety hazard prediction model may be configured to determine impact safety hazard data and pending safety hazard data of a certain gas inspection unit. That is, inputs and outputs of the impact safety hazard determination layer 410 and the pending safety hazard determination layer 420 are all relevant data of the gas inspection unit.

The input of the impact safety hazard determination layer 410 includes a unit type 411 and the gas safety hazard item 333, and an output includes impact safety hazard data 430.

The unit type 411 refers to a type of the gas inspection unit, for example, a pipeline, a regulator station, a valve, etc. More descriptions of the gas safety hazard item 333 and the impact safety hazard data 430 may be found in the relevant sections above.

The input of the pending safety hazard determination layer 420 includes the gas safety hazard item 333, the historical unit safety hazard data 334, and a rectification cycle 412, and output includes pending safety hazard data 440. More descriptions of the unit geographic information data 321, the unit environmental data 322, the gas safety hazard items 333, and the historical unit safety hazard data 334 may be found in the relevant sections above, such as FIGS. 2-3.

More descriptions of the rectification cycle 412 and the pending safety hazard data 440 may be found in the relevant sections above.

In some embodiments, the potential safety hazard prediction model 400 may be determined by independent training based on the impact safety hazard determination layer 410 and the pending safety hazard determination layer 420.

The impact safety hazard determination layer 410 may be determined based on a first training sample with a first label. The first training sample includes a unit type of a sample gas inspection unit and a sample gas safety hazard item. The first label includes the impact safety hazard data of the sample gas inspection unit (i.e., a second potential level). In some embodiments, the first training sample and the first label may be obtained based on simulation. For example, the management platform may randomly generate a large number of training samples and then determine the first label corresponding to each first training sample based on the simulation. For example, the management platform may simulate an actual malfunction of a gas safety hazard item of a certain gas inspection unit, and obtain a gas data change (e.g., a gas flow change, a gas pressure change, etc.) of other gas inspection units. The greater the gas data change, the larger the first label accordingly, and a specific correspondence may be preset.

The pending safety hazard determination layer 420 may be determined based on a second training sample with a second label. The second training sample includes sample historical unit safety hazard data, a sample gas safety hazard item, and a sample rectification cycle. The second label includes sample pending safety hazard data (including a sample pending safety hazard type, a sample pending safety hazard location, and a sample first potential level). Similarly, the second training sample and the second label may be obtained based on simulation. The sample pending safety hazard type and the sample pending safety hazard location in the second label may be obtained through manual labeling based on a simulated malfunction. The sample first potential level may be determined by a time interval from the beginning of the simulation to an actual occurrence of the malfunction. The larger the time interval, the smaller the sample first potential level, and a specific correspondence may be preset.

In some embodiments, the input of the pending safety hazard determination layer 420 may also include the unit geographic information data 321 and the unit environmental data 322.

In one or more embodiments of the present disclosure, different unit geographic information data and unit environmental data have different effects on the gas pipeline network (e.g., a device in a wet region is more prone to corrosion, etc.). The unit geographic information data and the unit environmental data is used as the input of the pending safety hazard determination layer, which may improve the accuracy of the pending safety hazard data.

In one or more embodiments of the present disclosure, the potential safety hazard data is determined based on the machine learning model, which may obtain a more accurate result compared with an empirical-based manner.

The basic concepts have been described above, and it is clear that the above detailed disclosure is intended as an example only for those skilled in the art and does not constitute a limitation of the present disclosure. The embodiments described in the present disclosure are used only to illustrate the principles of the embodiments of the present disclosure. Other variations may also fall within the scope of the present disclosure. Thus, by way of example and not limitation, alternative configurations of the embodiments of the present disclosure may be considered consistent with the teachings of the present disclosure. Accordingly, the embodiments of the present disclosure are not limited to the embodiments explicitly introduced and described in the present disclosure.

What is claimed is:

1. A method for managing a smart gas safety hazard item based on a Geographic Information System (GIS), wherein the method is implemented by a smart gas management platform of an Internet of Things (IoT) system for managing a smart gas safety hazard item based on a GIS and the method comprises:

obtaining gas safety hazard data of a gas pipeline network, wherein the gas safety hazard data includes a location of a historical safety hazard in the gas pipeline network and a safety hazard feature corresponding to the location, and the safety hazard feature includes at least one of a type of the safety hazard or a degree of the safety hazard;

dividing the gas pipeline network into one or more gas inspection units based on the gas safety hazard data and geographic information data of the gas pipeline network, wherein the geographic information data includes at least one of altitude data, perimeter road data, or vegetation data;

for each of the one or more gas inspection units, assigning one or more gas safety hazard items to the gas inspection unit based on the gas safety hazard data corresponding to the gas inspection unit;

determining a processing plan of the gas inspection unit, including:

obtaining unit geographic information data and unit environmental data of the gas inspection unit based on the gas GIS;

determining an environmental complexity and a weather complexity of the gas inspection unit based on the unit geographic information data and the unit environmental data; and determining the processing plan of the gas inspection unit based on the environmental complexity, the weather complexity, and the gas safety hazard item of the gas inspection unit, and historical unit safety hazard data, wherein the processing plan includes at least one of a processing priority, assignment of processing personnel, an environmental response plan, or a processing time; and determining an inspection plan based on the processing plan and a gas GIS, wherein the inspection plan includes at least one of an inspection route, an inspection time, or inspection content of the gas inspection unit, wherein the determining an inspection plan based on the processing plan and a gas GIS includes:

determining potential safety hazard data of different gas inspection units through a potential safety hazard prediction model based on the gas safety hazard data of the gas inspection unit, wherein the potential safety hazard data includes at least one of pending safety hazard data or impact safety hazard data, and the potential safety hazard prediction model is a machine learning model; and determining the inspection route through a second preset algorithm based on the potential safety hazard data, the processing plan, and the gas GIS.

2. The method of claim 1, wherein the dividing the gas pipeline network into one or more gas inspection units based on the gas safety hazard data and geographic information data of the gas pipeline network comprises:

dividing the gas pipeline network into the one or more gas inspection units through a first preset algorithm based on the geographic information data, environmental data, and a pipeline type.

3. An Internet of Things (IoT) system for managing a smart gas safety hazard item based on a GIS, wherein the IoT system for managing a smart gas safety hazard item based on a GIS includes a smart gas user platform, a smart gas service platform, a smart gas management platform, a smart gas pipeline network device sensing network platform, and a smart gas pipeline network device object platform, wherein the smart gas user platform includes a plurality of smart gas user sub-platforms;

the smart gas service platform includes a plurality of smart gas service sub-platforms;

the smart gas management platform includes a smart gas pipeline network safety management sub-platform and a smart gas data center, the smart gas management platform being configured to:

obtain gas safety hazard data of a gas pipeline network, wherein the gas safety hazard data includes a location of a historical safety hazard in the gas pipeline network and a safety hazard feature corresponding to the location, and the safety hazard feature includes at least one of a type of the safety hazard or a degree of the safety hazard, divide the gas pipeline network into one or more gas inspection units based on the gas safety hazard data and geographic information data of the gas pipeline network, wherein the geographic information data includes at least one of altitude data, perimeter road data, or vegetation data, for each of the one or more gas inspection units, assign one or more gas safety hazard items to the gas inspection unit based on the gas safety hazard data corresponding to the gas inspection unit, determine a processing plan of the gas inspection unit, the smart gas management platform being configured to:

obtain unit geographic information data and unit environmental data of the gas inspection unit based on the gas GIS, determine an environmental complexity and a weather complexity of the gas inspection unit based on the unit geographic information data and the unit environmental data, determine the processing plan of the gas inspection unit based on the environmental complexity, the weather complexity, and the gas safety hazard item of the gas inspection unit, and historical unit safety hazard data, wherein the processing plan includes at least one of a processing priority, assignment of processing personnel, an environmental response plan, or a processing time, and determine an inspection plan based on the processing plan and a gas GIS, wherein the inspection plan includes at least one of an inspection route, an inspection time, or inspection content of the gas inspection unit, and the smart gas management platform is further configured to:

determine potential safety hazard data of different gas inspection units through a potential safety hazard prediction model based on the gas safety hazard data of the gas inspection unit, wherein the potential safety hazard data includes at least one of pending safety hazard data or impact safety hazard data, and the potential safety hazard prediction model is a machine learning model, and determine the inspection route through a second preset algorithm based on the potential safety hazard data, the processing plan, and the gas GIS;

the smart gas pipeline network device sensing network platform is configured to interact with the smart gas data center and the smart gas pipeline network device object platform and send an instruction for obtaining data related to operation of a pipeline network device to the smart gas pipeline network device object platform; and the smart gas pipeline network device object platform is configured to obtain the data related to the operation of the pipeline network device.

4. The IoT system of claim 3, wherein the smart gas management platform is further configured to:

divide the gas pipeline network into the one or more gas inspection units through a first preset algorithm based on the geographic information data, environmental data, and a pipeline type.

5. A non-transitory computer-readable storage medium storing computer instructions, wherein when reading the computer instructions in the storage medium, a computer implements the method of claim 1.

* * * * *